(12) United States Patent
Shamoto et al.

(10) Patent No.: US 6,597,847 B2
(45) Date of Patent: Jul. 22, 2003

(54) OPTICAL FIBER FOR PRESERVING PLANE OF POLARIZATION

(75) Inventors: Naoki Shamoto, Sakura (JP); Fumihiko Nishimura, Sakura (JP); Kuniharu Himeno, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/057,069

(22) Filed: Jan. 25, 2002

(65) Prior Publication Data

US 2003/0086669 A1 May 8, 2003

(30) Foreign Application Priority Data

Jul. 11, 2001 (JP) ......................... 2001-210648

(51) Int. Cl.$^7$ ............... G02B 6/02; G02B 6/26; G02B 6/42
(52) U.S. Cl. .............. 385/123; 385/15; 385/43
(58) Field of Search ............. 385/123, 15, 43

(56) References Cited

U.S. PATENT DOCUMENTS

| | | | | |
|---|---|---|---|---|
| 4,896,942 A | * | 1/1990 | Onstott et al. | 385/127 |
| 5,179,603 A | * | 1/1993 | Hall et al. | 385/24 |
| 5,732,170 A | * | 3/1998 | Okude et al. | 385/27 |
| 6,463,195 B1 | * | 10/2002 | Sasaki et al. | 385/43 |

FOREIGN PATENT DOCUMENTS

| | | | | |
|---|---|---|---|---|
| JP | 59-92929 | 5/1984 | ........... | C03B/37/00 |
| JP | 63-194207 | 8/1988 | ........... | G02B/6/16 |
| JP | 1-222208 | 9/1989 | ........... | G02B/6/16 |
| JP | 4-67105 | 3/1992 | ........... | G02B/6/16 |

OTHER PUBLICATIONS

Kikuchi, Y., et al., "Development of Polarization Maintaining Optical Fibers," Fujikura Technical Review, No. 16, Apr. 1987, pp. 1–12.

Taya, H., et al., "Fusion Splicer for Polarization Maintaining Single Mode Fiber," Fujikura Technical Review, No. 19, Jan. 1990, pp. 31–36.

* cited by examiner

*Primary Examiner*—Brian Healy
(74) *Attorney, Agent, or Firm*—Bell, Boyd & Lloyd LLC

(57) ABSTRACT

An optical fiber for preserving plane of polarization including a core; and a clad disposed so as to surround the core, wherein the mode field diameter non-circularity ratio of the optical fiber which is calculated according to the equation:

$$\text{MFD non-circularity ratio (\%)} = \frac{Ma - Mb}{\sqrt{\frac{Ma^2 + Mb^2}{2}}} \times 100$$

(where MFD indicates a mode field diameter, and Ma is the maximum value and Mb is the minimum value of the mode field diameter, respectively, in a wavelength region of light used), is about 3.2% or less. The connection loss of the optical fiber may be decreased to about 0.13 dB or less.

4 Claims, 1 Drawing Sheet

OPTICAL FIBER FOR PRESERVING PLANE OF POLARIZATION

BACKGROUND OF THE INVENTION

1. Field of the Invention

The present invention relates to an optical fiber for preserving the plane of polarization. More specifically, the present invention relates to an optical fiber for preserving the plane of polarization which has excellent connection properties.

2. Background Art

These days, optical fibers for preserving the plane of polarization (hereinafter also referred to as polarization plane preserving optical fibers), which are capable of propagating light while maintaining two independent polarization states, are widely used in the field of optical communication and of photo sensors.

The polarization plane preserving optical fibers have a different refractive index in the transverse direction and the longitudinal direction so that a large difference in the propagation constant between the transverse and the longitudinal directions is generated and the mode coupling between the two polarization light becomes small.

A variety of types of polarization plane preserving optical fibers have been developed, and among them, the PANDA type optical fiber has a low degree of connection loss and is excellent for commercial production. The PANDA type optical fiber may be defined as an optical fiber that includes a stress imparting part that has a circular cross section and is made of a silica glass containing boron oxide ($B_2O_3$). An example of the cross section of the PANDA type optical fiber in its longitudinal direction is shown in FIG. 2.

In FIG. 2, the PANDA type optical fiber 10, which is an example of a polarization plane preserving optical fiber, includes a core 11, a clad 12, and stress imparting parts 13. Since the thermal expansion coefficient of each of the stress imparting parts 13, which is made of a silica glass doped with boron oxide, is a few times larger than that of a silica glass that does not include boron oxide, it shrinks when being subjected to a drawing process. At that time, one stress which acts to pull the core 11 in the direction connecting the two stress imparting parts 13 and another stress which acts to compress the core 11 in the vertical direction with respect to the above-mentioned stress are generated and maintained in the fiber. When these different stress are added, the refractive index of the optical fiber varies in the direction connecting the two stress imparting parts 13 and in the vertical direction thereto.

Due to the different refractive indexes in the two directions, the velocity of light propagating through the PANDA type optical fiber is varied. That is, the velocity of light which propagates through the PANDA type optical fiber 10 in the direction connecting the stress imparting parts 13 is slow, and this is called a slow axis or X-axis. On the other hand, the velocity of light which propagates through the PANDA type optical fiber 10 in the vertical direction with respect to the X-axis is fast, and this is called a fast axis or Y-axis.

However, since the viscosity of the stress imparting part 13 of the PANDA type optical fiber is smaller than that of the clad 12 which surrounds the stress imparting part 13, it is not easy to produce a core 11 having an ideal circular cross section, and usually, a non-circular cross section thereof tends to be produced during the fiber forming process at high temperature. If the cross section of the core 11 is non-circular, the degree of connection loss is increased when connecting these optical fibers.

On the other hand, in a single mode fiber, such as a polarization plane preserving optical fiber, light power is also propagated to portions of the clad 12 in the vicinity of the core 11. The magnitude of propagation towards the clad 12 is exponentially decreased, and as far as the single mode fiber is concerned, the mode field diameter (MFD), which expresses the degree of propagation of the light power in the optical fiber, has an important meaning as compared with a core size, which indicates a physical boundary in relation to the distribution of refractive index. Accordingly, it is thought that the connection characteristic of a polarization plane preserving optical fiber is greatly effected by the degree of non-circularity of the mode field diameter. Therefore, it is necessary to determine the degree of circularity of the mode field diameter which is sufficient to obtain a polarization plane preserving optical fiber having excellent connection properties.

SUMMARY OF THE INVENTION

The object of the present invention includes providing a polarization plane preserving optical fiber having a low connection loss by minimizing the degree of non-circularity of the mode field diameter.

The above object may be achieved by an optical fiber for preserving the plane of polarization, including: a core and a clad disposed so as to surround the core, wherein the mode field diameter non-circularity ratio of the optical fiber which is calculated according to the equation:

$$MFD\ non\text{-}circularity\ ratio\ (\%) = \frac{Ma - Mb}{\sqrt{\frac{Ma^2 + Mb^2}{2}}} \times 100$$

where MFD indicates a mode field diameter, and Ma is the maximum value and Mb is the minimum value of the mode field diameter, respectively, in a wavelength region of light used), is about 3.2% or less to minimize a connection loss.

In another aspect of the invention, the core non-circularity ratio of the optical fiber, which is defined as a value obtained by dividing the difference between the diameter of a circumscribing circle and that of an inscribing circle of the core by the diameter of the core, is about 20% or less.

In yet another aspect of the invention, the optical fiber for preserving the plane of polarization is a PANDA type optical fiber.

BRIEF DESCRIPTION OF THE DRAWINGS

Some of the features and advantages of the invention having been described, others will become apparent from the detailed description which follows, and from the accompanying drawings, in which.

DESCRIPTION OF THE PREFERRED EMBODIMENTS

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples of the invention.

Figure 1:
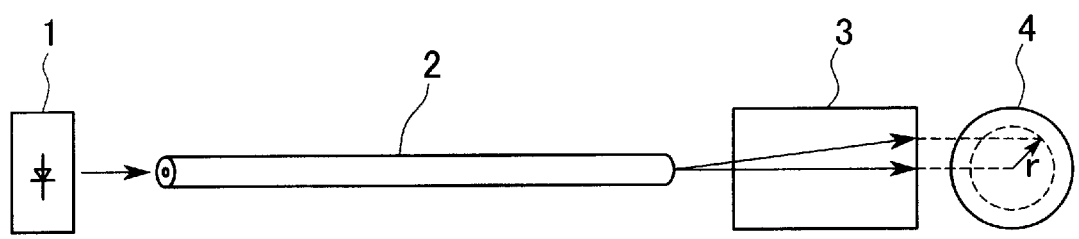
FIG. 1 is a diagram showing an example of measuring the mode field diameter of a polarization plane preserving optical fiber.
Figure 2:
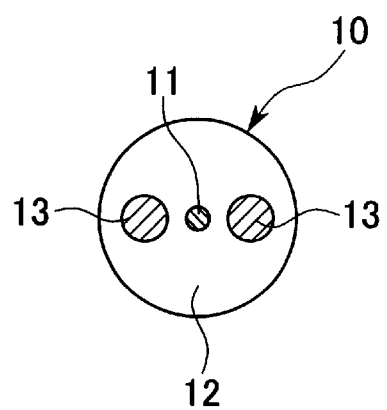
FIG. 2 is a diagram showing a cross section of a PANDA type optical fiber for preserving plane of polarization in the longitudinal direction.

FIG. 1 is a diagram showing an example of a device for measuring the mode field diameter, which is a quantity having an influence on the connection loss of a polarization plane preserving optical fiber.

In FIG. 1, the numeral 1 indicates a laser light source, the numeral 2 indicates a polarization plane preserving optical fiber, which is the optical fiber to be measured and may be, for instance, a PANDA type optical fiber, and the numeral 3 indicates a light beam amplifying device which includes a lens system.

The $LP_{01}$ mode emitted from the laser light source 1 incident on an end portion of the polarization plane preserving optical fiber 2 propagates through the optical fiber 2. The light then exits from the other end of the polarization plane preserving optical fiber 2 to enter the light beam amplifying device 3. The light beam amplifying device 3 amplifies the light beam from the polarization plane preserving optical fiber 2, and the amplified light beam is received by an infrared camera from which its two-dimensional light intensity distribution is output as an image 4.

If the polarization plane preserving optical fiber 2 has an ideal axial symmetry, the light intensity distribution thereof output as the image 4 forms concentric circles, and hence, the radius r of the image 4 is the same in any directions. In practice, however, the polarization plane preserving optical fiber 2 produced does not have an ideal axial symmetry and its waveguide portion has a non-circular cross-section. Accordingly, the radius r of the image 4 is dispersed and not the same. Using the maximum and minimum values of the radius r, it is possible to calculate the mode field diameter 2w according to the equation (1):

$$2w = 2\left[2\int_0^\infty r \cdot f^2(r)\,dr \bigg/ \int_0^\infty r\left(\frac{d}{dr}f(r)\right)^2 dr\right]^{1/2} \quad (1)$$

In the above equation (1), f(r) indicates an electric field distribution, and the square of the electric field $f^2$ is proportional to the light power. The mode field diameter non-circularity ratio, which is a value indicating the degree of non-circularity of the mode field diameter, may be calculated from the maximum and minimum values of the mode field diameter, obtained by the above equation (1) using the following equation (2):

$$\text{MFD non-circularity (\%)} = \frac{Ma - Mb}{\sqrt{\frac{Ma^2 + Mb^2}{2}}} \times 100 \quad (2)$$

In the above equation (2), MFD indicates a mode field diameter, Ma indicates the value of the mode field diameter, and Mb indicates the minimum value of the diameter.

Table 1 shows the mode field diameter non-circularity ratio, the core non-circularity ratio, and the core eccentricity amount of the polarization plane preserving optical fibers having a relatively large degree of core non-circularity that exceeds about 15%. The non-circularity of the core is considered to be caused by the viscosity of the stress imparting part which is smaller than that of the clad in the fiber forming process.

TABLE 1

| Sample No. | Core non-circularity ratio (%) | MFD non-circularity ratio (at 1550 nm) (%) | Core eccentricity amount (μm) |
|---|---|---|---|
| 1 | 15.04 | 2.16 | 0.15 |
| 2 | 14.58 | 1.19 | 0.37 |
| 3 | 17.35 | 1.54 | 0.02 |
| 4 | 17.51 | 2.32 | 0.20 |
| 5 | 20.04 | 3.20 | 0.05 |
| 6 | 20.47 | 1.12 | 0.10 |
| 7 | 25.52 | 4.50 | 0.24 |
| 8 | 25.83 | 5.50 | 0.11 |

The core non-circularity ratio may be defined as a value obtained by dividing the difference between the diameter of a circumscribing circle and that of an inscribing circle of the core by the core diameter. Also, the core eccentricity amount may be defined as the distance between the center of the core and that of the clad. Moreover, the mode field diameter non-circularity ratio may be defined as a value which is calculated based on the mode field diameter measured when light having the wavelength of 1550 nm is input.

Table 2 below shows connection loss generated when two of the polarization plane preserving optical fibers shown in Table 1 were connected.

TABLE 2

| Combina-Tion No. | Sample No. | | Core non-circularity ratio (%) | | Core eccentricity amount (μm) | | Connection loss (dB) |
|---|---|---|---|---|---|---|---|
| 1 | 1 | 1 | 15.04 | 15.04 | 0.15 | 0.15 | 0.01–0.03 |
| 2 | 1 | 2 | 15.04 | 14.58 | 0.15 | 0.37 | 0.02–0.04 |
| 3 | 2 | 2 | 14.58 | 14.58 | 0.37 | 0.37 | 0.01–0.08 |
| 4 | 2 | 4 | 14.58 | 17.51 | 0.37 | 0.20 | 0.02–0.04 |
| 5 | 2 | 6 | 14.58 | 20.47 | 0.37 | 0.10 | 0.04–0.05 |
| 6 | 3 | 3 | 17.35 | 17.35 | 0.02 | 0.02 | 0.01–0.02 |
| 7 | 3 | 4 | 17.35 | 17.51 | 0.02 | 0.20 | 0.01–0.04 |
| 8 | 4 | 4 | 17.51 | 17.51 | 0.20 | 0.20 | 0.01–0.02 |
| 9 | 4 | 6 | 17.51 | 20.47 | 0.20 | 0.10 | 0.11–0.13 |
| 10 | 5 | 5 | 20.04 | 20.04 | 0.05 | 0.05 | 0.01–0.02 |
| 11 | 5 | 6 | 20.04 | 20.47 | 0.05 | 0.10 | 0.01–0.03 |
| 12 | 6 | 6 | 20.47 | 20.47 | 0.19 | 0.19 | 0.01–0.03 |
| 13 | 1 | 7 | 15.04 | 25.52 | 0.15 | 0.24 | 0.15–0.52 |
| 14 | 2 | 7 | 14.58 | 25.52 | 0.37 | 0.24 | 0.11–0.62 |
| 15 | 1 | 8 | 15.04 | 25.83 | 0.15 | 0.11 | 0.12–0.67 |
| 16 | 2 | 8 | 14.58 | 25.83 | 0.37 | 0.11 | 0.20–0.54 |

The wavelength of light used for the measurements was 1550 nm, and the measurements were carried out by rotating a connection surface of one of the optical fibers to be connected by 90° for each measurement.

In Table 2, the reason why there is a range in the values of the connection loss is because, as mentioned above, the measurements were carried out while rotating the connection surface of the fiber, and the connection loss is small when the directions of non-circularity of the mode field diameter are matched. The connection loss is increased as the directions of the mode field diameter are shifted.

As it is clear from Table 2, the maximum value of the connection loss is 0.13 dB even when the core non-circularity ratio of the polarization plane preserving optical fiber to be connected is about 20% if the mode field diameter non-circularity ratio is about 3.2% or less for the connection of the polarization plane preserving optical fibers of the combination numbers 1–12. Accordingly, taking into account the allowable limit of ordinary optical fibers of 0.2–0.3 dB, the connection loss is considered to be excellent.

On the other hand, for the connection of the polarization plane preserving optical fibers of the combination numbers 13–16, the core non-circularity ratios of the polarization plane preserving optical fiber thereof are larger than 25% and the mode field diameter non-circularity ratios are 4.5% or greater. In those cases, the maximum connection loss is greater than 0.5 dB, and this value is much larger than the above-mentioned allowable limit of 0.2–0.3 dB. Accordingly, these fibers are not suitable for a practical use.

In view of the above results, a polarization plane preserving optical fiber of small connection loss may be produced by making the mode field diameter non-circular ratio of the fiber to be about 3.2% or less. In order to produce such a polarization plane preserving optical fiber, a base material having a small core non-circular ratio is used and the tension of the fibers are adjusted in the fiber forming process.

Also, in view of the above results, it is preferable that the core non-circularity ratio of a polarization plane preserving optical fiber to be 20% or less.

Note that although the above explanation is made for the measurements of the mode field diameter using light having the wavelength of 1550 nm, the wavelength of light is not limited to 1550 nm. Since the mode field diameter expresses the degree of light power to propagate through the optical fiber at a wavelength used, the object of the invention can be achieved if the mode field diameter non-circularity ratio in the wavelength region used is 3.5% or less.

Also, although the PANDA type optical fiber is used as an example in the above explanation, it is not limited as such and other types of polarization plane preserving optical fibers having a stress imparting part disposed around a core may be used according to the present invention.

In such cases, a polarization plane preserving optical fiber having a small connection loss may be produced by decreasing the mode field diameter non-circularity of the polarization plane preserving optical fiber to about 3.2% or less.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. An optical fiber for preserving plane of polarization, comprising:
   a core; and
   a clad disposed so as to surround said core, wherein
   a mode field diameter non-circularity ratio of the optical fiber which is calculated according to the equation:

$$MFD\ non\text{-}circularity\ ratio\ (\%) = \frac{Ma - Mb}{\sqrt{\frac{Ma^2 + Mb^2}{2}}} \times 100$$

(where MFD indicates a mode field diameter, and Ma is the maximum value and Mb is the minimum value of the mode field diameter, respectively, in a wavelength region of light used), is about 3.2% or less to reduce the connection loss.

2. An optical fiber for preserving plane of polarization according to claim 1, wherein
   the core non-circularity ratio of said optical fiber, which is defined as a value obtained by dividing the difference between the diameter of a circumscribing circle and that of an inscribing circle of said core by the diameter of said core, is about 20% or less.

3. An optical fiber for preserving plane of polarization according to claim 1, wherein said optical fiber for preserving the plane of polarization is a PANDA type optical fiber.

4. An optical fiber for preserving plane of polarization according to claim 2, wherein said optical fiber for preserving the plane of polarization is a PANDA type optical fiber.

* * * * *